Figures 1, 5:
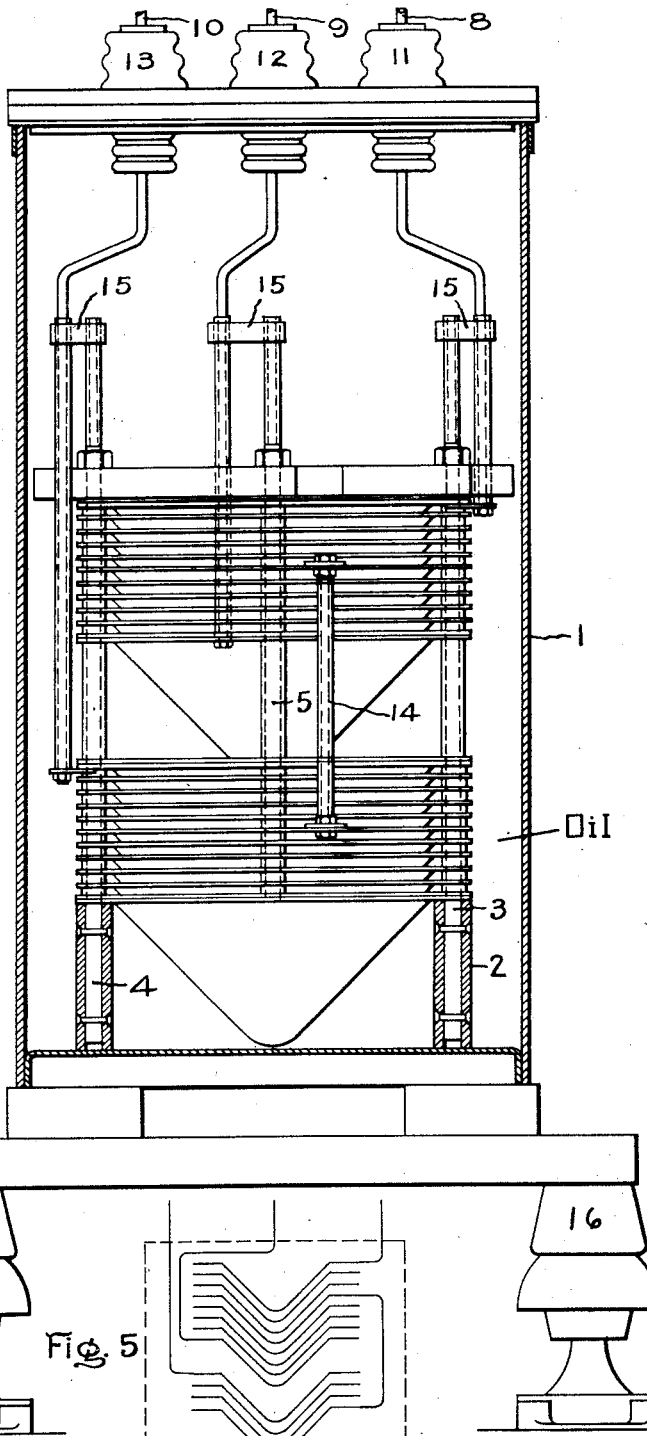

F. T. FORSTER.
LIGHTNING ARRESTER.
APPLICATION FILED DEC. 12, 1908.

1,035,338.

Patented Aug. 13, 1912.
2 SHEETS—SHEET 1.

WITNESSES:
J. Ellis Elen
J. Earl Ryan

INVENTOR:
FRANK T. FORSTER.
BY
ATTY.

F. T. FORSTER.
LIGHTNING ARRESTER.
APPLICATION FILED DEC. 12, 1908.
1,035,338.
Patented Aug. 13, 1912.
2 SHEETS—SHEET 2.
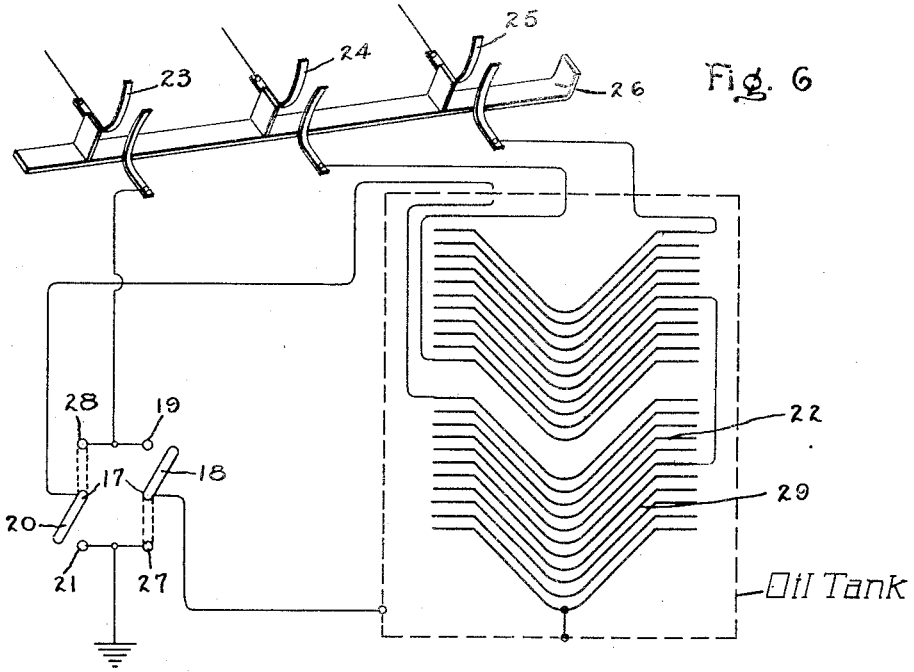
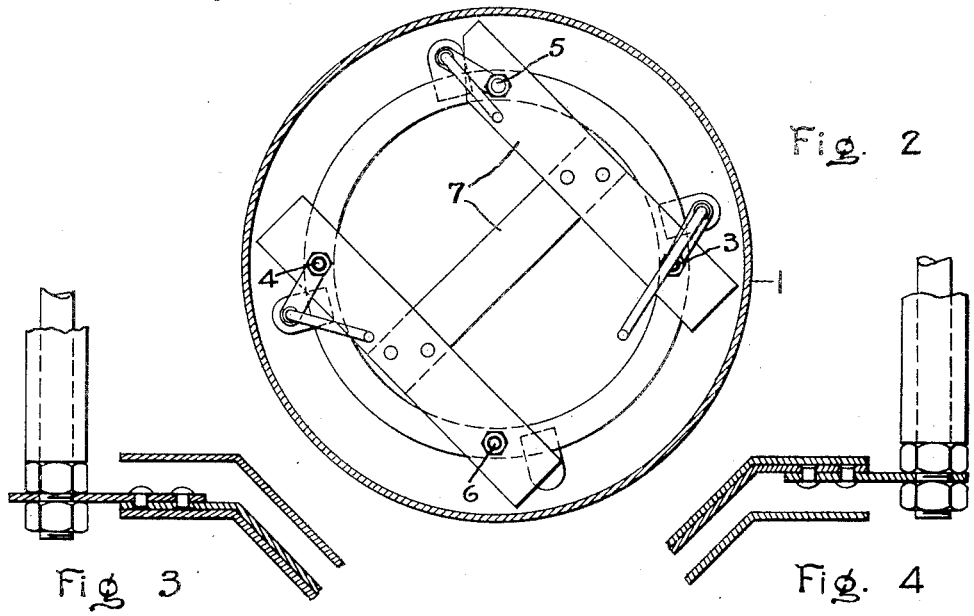
WITNESSES:
J. Ellis Elen
J. Earl Ryan
INVENTOR:
FRANK T. FORSTER,
BY
ATTY.

UNITED STATES PATENT OFFICE.

FRANK T. FORSTER, OF SCHENECTADY, NEW YORK, ASSIGNOR TO GENERAL ELECTRIC COMPANY, A CORPORATION OF NEW YORK.

LIGHTNING-ARRESTER.

1,035,338.      Specification of Letters Patent.      Patented Aug. 13, 1912.

Application filed December 12, 1908. Serial No. 467,176.

*To all whom it may concern:*

Be it known that I, FRANK T. FORSTER, a citizen of the United States, residing at Schenectady, in the county of Schenectady and State of New York, have invented certain new and useful Improvements in Lightning-Arresters, of which the following is a specification.

My invention relates to electrolytic lightning arresters of the well-known aluminum type, which comprises in general aluminum electrode plates in contact with a suitable electrolyte, and which have an insulating film formed upon the surface upon the passage of an electric current. This film allows only a very small leakage current to flow, unless the voltage impressed exceeds the certain critical voltage. In this case the film is broken down and a discharge through the cell may take place freely, the cell acting in this case like an electric safety valve. When using cells of this kind in order to protect a polyphase transmission line from lightning or unusual high-voltage disturbances, it has been customary heretofore to use a separate cell inclosed in its own container for each phase. For systems of moderate voltage, such as several thousand volts, a saving in material and space may be effected by inclosing all the plates forming the cells for each phase in a single container, making such connections as will connect the plates in the same relation as though distributed in separate tanks.

The present invention comprises a lightning arrester of this kind, in which a plurality of cells are housed in a single tank and connected in proper relation to each other to protect the lines of the polyphase transmission system.

In the accompanying drawings Figure 1 shows a longitudinal section through the cell; Fig. 2 shows a top view of the cell; Figs. 3 and 4 are fragmentary views, showing the manner of making connections to the plates; Fig. 5 is a diagrammatic view of a modified form of cell; and Fig. 6 is a diagrammatic view, illustrating the external connections of the cell with a switch adapted to interchange the relation of the plates at intervals.

As shown in Figs. 1 and 2, the aluminum plates are rigidly mounted upon common supports and placed within a container 1, which may be of metal. The plates are mounted to form two separate groups insulated from each other, the lower group resting upon a metallic ring 2, which makes direct electrical contact with the metallic container 1. From this ring extend four supporting rods 3, 4, 5, 6, which are made of some insulating material, as oil-soaked wood, having sufficient strength and toughness to rigidly support the plates. The plates, or cups, are frusto-conical in shape and have flanged edges, which are perforated to permit their being slipped over the spacing rods. The cups are insulated from each other by fiber washers. After the cups are thus built up they are filled with electrolyte. It is advantageous to make the lowermost and uppermost cups of double thickness, as by simply supplying an extra cup, so that in case holes should be eaten through the lowermost or uppermost cup the fluid contained within this cup will be prevented from escaping by the extra cup. The cups are firmly held in position by a spacing piece 7 consisting of two parallel pieces of oiled wood connected by a cross piece, as shown in Fig. 2. This H-shaped spacing piece is firmly clamped down upon the cups by means of nuts. Leading-in conductors 8, 9, 10 are separated from the container 1 by suitable insulators 11, 12, 13 passing through the cover of the tank. The leading-in conductor 8 connects with the uppermost cup of the upper group of cups. The leading-in conductor 9 connects with the lowermost cup of the same group. The leading-in conductor 10 connects with the uppermost cup of the lower group. The connecting rod or intermediate connection 14 makes contact with the middle cup of the upper group and the middle cup of the lower group. The manner of connecting with the flanged edge of the cups is illustrated in Figs. 3 and 4. Both the leading-in conductors and the connecting rod 14 are surrounded by a sheath of insulating material as fiber, in order to prevent short-circuiting should a slight displacement of the cups occur. The leading-in conductors 8, 9, 10 are connected by means of insulating cross pieces 15 to three of the upright supporting rods, in order to more firmly hold them in position. The cell when thus assembled is surrounded by a body of oil, which separates the two groups of cups and serves to insulate the edges of the cups, and also, to absorb heat when a discharge takes place. The cell is insulated from the ground by means of supporting standards 16. The reason for insulating the cell from the ground will hereinafter become apparent. It will be observed that the cell when thus assembled, and when the connections are made as described, the middle cup of the lower group of cups will be at a neutral point, as the current when entering the cell through either one of the leading-in conductors 8, 9, 10 must pass through one-quarter the total number of cups, in order to arrive at this point. The current from conductor 8 will pass through the upper half of the upper group of cups. The current in the conductor 9 will pass through the lower half of this same group. The current entering conductor 10 will pass through the lower half of the lower group. These groups we may call the phase legs. The lower half of the lower group of cups will then be the ground leg, being connected between the neutral and ground. A cell connected in this manner can be used either for a three-phase delta or ungrounded Y system. For a grounded Y system the ground legs may be omitted; the plates then being connected as shown diagrammatically in Fig. 5.

When a cell of this kind is connected to the line in series with a spark gap, the electrode film tends to deteriorate, and a current must be periodically sent through the cell in order to reëstablish the film. As the ground leg is connected between the neutral point and the ground, it will receive practically no current when the cell is periodically connected to the line, unless some special provision is taken. As shown in Fig. 6, the renewal of the film on the ground leg is accomplished by alternately interchanging the ground leg for one of the phase legs when current is sent through the cell. This is accomplished by means of transfer switch 17. When the switch lever 18 is brought in contact with the point 19, and the switch lever 20 is brought in contact with the point 21, the upper half 22 of the lower group of cups will be connected between the neutral point and ground. When, therefore, the horn gaps 23, 24, 25 are bridged by the lateral movement of the rod 26, the upper group of cups and the lower half of the lower group of cups will have their films reëstablished. When the switch lever 18 is turned to the point 27 and the switch lever 20 to point 28, the lower half 29 of the lower group of cups will be between the neutral point and the ground, and the remaining cups will have their film reëstablished. The switch lever 18 should be in contact with point 27 and switch lever 20 in contact with point 28, for running condition.

What I claim as new and desire to secure by Letters Patent of the United States, is:

1. In a protective device, the combination of a vertical cylindrical vessel containing insulating liquid, a plurality of electrodes submerged in said liquid and positioned one above the other in vertical alinement to form sets of electrodes, the electrodes of each set being in contact with an electrolyte, means for spacing said sets apart vertically to permit said insulating liquid to form a barrier of insulation between said sets, line terminals for the end electrodes of one of said sets, a line terminal and a ground terminal for the other of said sets, and an intermediate connection in said vessel between the middle electrode of the first set and an electrode of the other set.

2. In a protective device, the combination of a vertical cylindrical vessel containing oil, two sets of cup-shaped electrodes mounted one above the other in said vessel beneath the surface of the oil, said electrodes of each set being nested one above the other in vertical alinement and having an electrolyte therein, two line terminals connected to the end electrodes of the upper of said sets, a line terminal connected to the upper electrode of the lower set, connections to said terminals extending through the top of said vessel, a ground connection for an electrode of one of said sets, insulating spacers between said sets for maintaining between said sets of electrodes a layer of oil for preventing discharges between said sets, and an intermediate connection beneath the surface of the oil between an electrode of one set and an electrode of the other set.

3. A protective device comprising a vertical cylindrical vessel containing insulating liquid, a plurality of cup-shaped electrodes mounted in said vessel beneath said liquid and in vertical alinement, said electrodes being nested to form sets, each set containing an electrolyte, insulating supports for maintaining said sets in vertical alinement and spaced apart from one another a sufficient distance to permit said insulating liquid to form a barrier of insulation between said sets, terminals for the end electrodes of each set, and a vertical connection between the middle electrode of one set and an electrode of an adjacent set totally immersed in said insulating fluid.

4. In a protective device, the combination of a vertical cylindrical vessel containing oil, cup-shaped aluminum electrodes mounted in vertical alinement in said vessel and arranged in two sets, the electrodes in each set being nested and containing an electrolyte, vertical insulating supports resting on the bottom of said vessel and engaging the edges of said electrodes to hold them in position, said sets of electrodes being arranged on said supports to leave between said sets a space filled with oil whereby discharge between said sets is prevented, line connections from the electrodes of each set extending through the top of the vessel, means carried by said supports for holding said connections in position, a ground connection for one of the electrodes and one of said sets, and an intermediate connection between the middle electrode of one set and one of the electrodes of the other set said connection being submerged in the oil.

5. The combination with the conductors of a system to be protected, of an electrolytic cell comprising a set of electrodes, means for connecting the middle electrode of said set to one conductor, and means for at will connecting either end electrode to ground and the other end electrode to another conductor.

6. The combination with the conductors of a system to be protected, of an electrolytic cell comprising a plurality of sets of electrodes, connections between two of said conductors and the end electrodes of one of said sets, an intermediate connection between the middle electrode of said set and an electrode of a second set, and means for at will connecting either end electrode of said second set to another conductor and connecting the other end electrode of said second set to ground.

7. In combination with a polyphase transmission system, an electrolytic lightning arrester, comprising a plurality of sets of plates separated by electrolyte, each set connected to one phase and to a common neutral, comprising the phase-leg cells, a set of plates equal in number to those of any one phase leg connected between the neutral and the ground, comprising a ground leg, a single container for said plates, and switching means for interchanging one of the phase legs with the ground leg.

In witness whereof, I have hereunto set my hand this 11th day of December, 1908.

FRANK T. FORSTER.

Witnesses:
BENJAMIN B. HULL,
HELEN ORFORD.